July 16, 1935.  F. W. JACKMAN  2,008,020
FOCUSING DEVICE FOR CINEMATOGRAPHIC APPARATUS
Filed Nov. 15, 1932
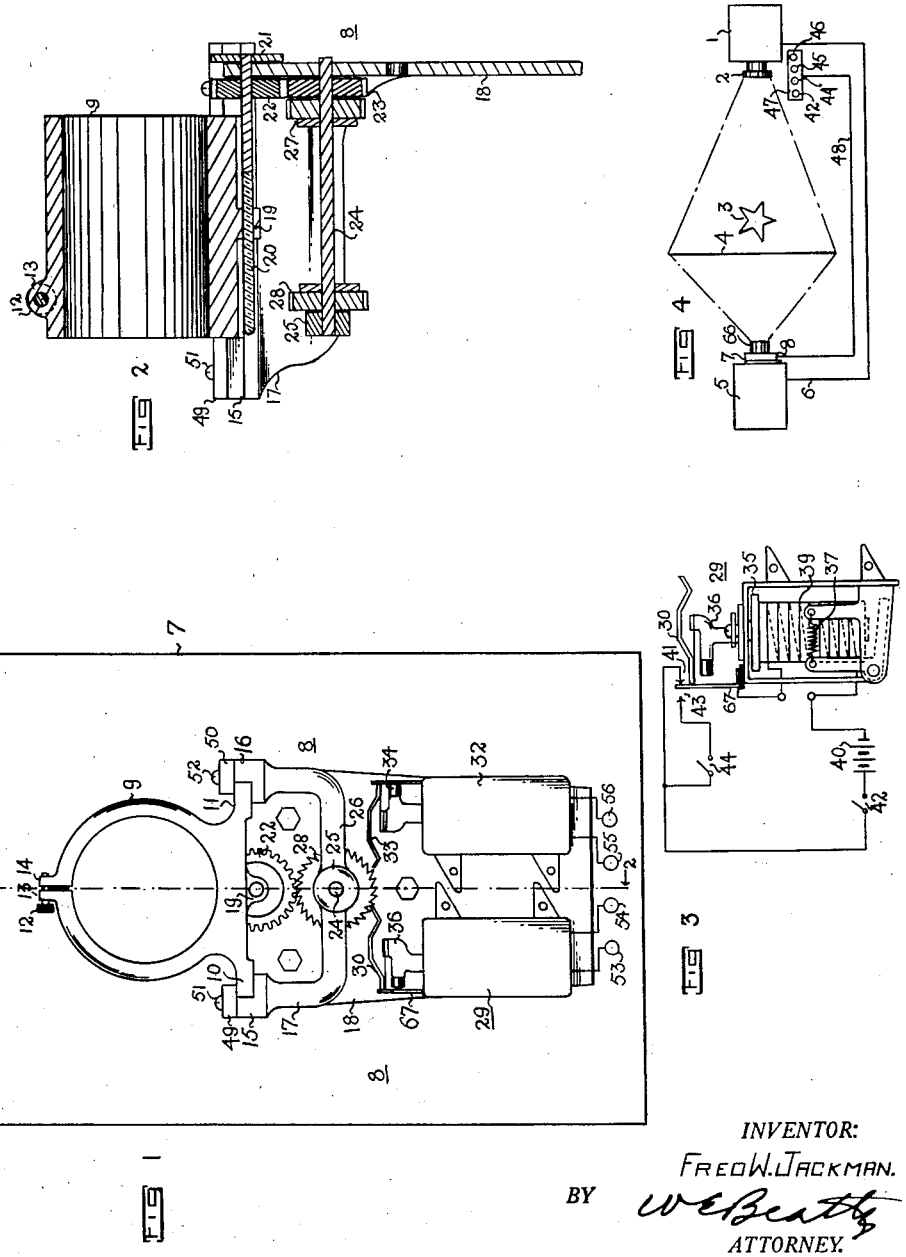
INVENTOR:
Fred W. Jackman.
BY W. E. Beatty
ATTORNEY.

Patented July 16, 1935

2,008,020

UNITED STATES PATENT OFFICE 2,008,020

FOCUSING DEVICE FOR CINEMATOGRAPHIC APPARATUS

Fred W. Jackman, Beverly Hills, Calif., assignor to Warner Bros. Pictures, Inc., New York, N. Y., a corporation of Delaware Application November 15, 1932, Serial No. 642,698

2 Claims. (Cl. 88—24)

This invention relates to the art of photography and has to do with the making of composite motion pictures by the so-called translucent screen method.

An object of the invention is to overcome a certain difficulty which has been encountered when focusing a projector onto a translucent screen, for the projection of motion pictures, to be photographed, in conjunction with an action component, by a motion picture camera located on the opposite side of the screen.

At the present time, when a cameraman is focusing his camera to photograph the action and the projected background scene, he must telephone to the projectionist and direct him how to focus the projected picture, as the projectionist is unable to see the projected picture due to flare caused by light reflected from the screen. As will be readily understood, this phoning involves considerable inconvenience and loss of time.

The present invention overcomes this difficulty by making it possible to focus the projector from a point adjacent the camera.

This is accomplished by providing a motor mounted on the projector for effecting the adjustment of the lens mount. The circuit of this motor is controlled by a switch located adjacent the camera, where it may be controlled by a camera operator.

For further details of the invention reference may be made to the drawing, wherein:

Figure 1 is a front elevation of a lens mount of a preferred type.

Figure 2 is a cross-section, with parts omitted for the sake of clarity, along the line 2—2 of Figure 1.

Figure 3 is a diagrammatic view of a convenient circuit arrangement for controlling the motors used in this invention.

Figure 4 is a diagrammatic view of a motion picture camera and projector embodying this invention set up for photographing.

Referring in detail to the drawing, the camera 1, (Fig. 4) is provided with the usual lens 2 which is focused to photograph an action component 3, located on a suitable stage in front of a translucent screen 4. Action 3 may consist of an actor or a plurality of actors or a set or any other form of tangible object. Translucent screen 4 may be of that type having a cellulose base as described and claimed in my co-pending application, S. N. 631,964, filed September 7, 1932.

A projector 5 is located on the opposite side of the screen 4. The camera 1 and the projector 5 have a suitable electric interlock 6 for synchronous operation. Projector 5 has a front wall 7 supporting a lens barrel 66. A lens mount 8 is mounted on the wall 7.

The mount 8 consists primarily of a split ring 9 adapted to fit around the annulus of lens barrel 66. The ring 9 is tightened or loosened as desired, by a thumb screw 12, which passes through a pair of lugs 13 and 14 mounted on either side of the slit in the ring 9. The bottom of the ring 9 extends outwardly to form two rectangular shoes 10 and 11 which ride in a pair of recessed guides 15 and 16. The guides 15 and 16 are formed on the upper extensions of a U shaped casting 17 that is integral with a base plate 18. The upper walls 49 and 50 of the guides 15 and 16 are detachable and held in place by a series of screws such as 51 and 52.

There is a flange 19 depending from the bottom of ring 9, having a screw threaded aperture in which rides a machine screw 20. Screw 20 is extended and journaled in a suitable bearing housing 21 in the base plate 18. A pinion gear 22 is mounted on the screw 20, adjacent the base 18 and meshes with a second pinion gear 23 mounted on a shaft 24. Shaft 24 is journaled at one end in a bearing 25 mounted in the cross-arm 26 of the U shaped extension 17.

A ratchet gear 27 having a left hand ratchet is mounted on the shaft 24 adjacent the pinion 23. A second ratchet 28 having a right hand ratchet is mounted on the shaft 24 adjacent the bearing 25, so that when the ratchet 28 is turned, the lens ring 9 will be advanced, and when the ratchet 27 is turned, the lens ring 9 will be retracted.

Mounted on the base 18 is an electro-magnetic motor 29 which has an extending pawl arm 30, mounted on a contact armature 36. Pawl arm 30 engages ratchet wheel 27. A similar electromagnetic motor 32 is mounted adjacent motor 29. It has a pawl arm 33 mounted on a contact armature 34. Pawl arm 33 engages ratchet 28. The motors 29 and 32 are exactly similar and a description will be given of one of them, 29, as shown in Figure 3.

The motor consists of an electro-magnet 35 having a contact armature 36, normally held open at contact 43 and closed at contact 41 as in Figure 3, by a spring 37. The electro-magnet 35 has a suitable magnetic winding 39. One terminal of the winding 39 is connected to a suitable source of potential, such as battery 40. The other terminal is connected to a contact arm 67 carried by the armature 36. A back contact 41 is located adjacent the contact arm 67 and connected in series with the battery 40. A switch 42 is located in the circuit between battery 40 and contact 41. The circuit between the battery 40 and the armature 36 is branched and connected to back contact 41 and to front contact 43, these contacts being located on opposite sides of the contact arm 67. Contact 43 is connected through a switch 44 to the circuit from switch 42. Contacts 41 and 43 complete the circuit through the winding 39 when the armature is released and attracted respectively. Switches 42 and 44 are remotely situated adjacent the camera operator.

The normal position of the apparatus is with both the switches 42 and 44 closed. Similarly the two corresponding switches provided for the solenoid 32 are closed, whereby the armatures 34 and 36 are held against their respective front contacts, such as 43, by the solenoids. In other words, the pawl arms 30 and 33 attached to the armatures 34 and 36 are disengaged from their respective ratchets 27 and 28.

When the switch 44 is open, thereby opening the locking circuit for the winding 39, and the switch 42 is closed, or when the same circuit conditions prevail for motor 32, the motors 29 and 32 will alternatively act as buzzers and rapidly advance or retract the lens of the projector 5, as desired.

When the switch 44 is closed, the switch 42 may be opened and closed at will and the armature 36 will move with a step by step motion as is well understood. When similar circuit conditions prevail for the motor 32, the armature 34 will also move with a step by step motion and so the lens ring 9 may be slowly advanced or retracted as desired.

Switches 42 and 44 are shown in Figure 4 together with the switches 45 and 46 (for the second electro-magnetic motor) located on a suitable panel 47 adjacent the camera 1. These switches are connected by suitable circuits 48 to the respective motors 29 and 32. Four contact terminals 53, 54, 55, and 56, two for each of the electro-magnetic motors 29 and 32, are mounted on the base 8.

In the operation of this device when the camera operator wishes to change the focus of the projector 5, he opens one of either of the switches 44 or 45 which will rapidly advance or retract the lens ring 9 as desired until a rough focus has been obtained. He then opens and closes, as desired, either the switch 42 or the switch 46, whereby the actuated motor will move with a step by step motion and the focus may be completed with a micrometer precision. A very accurate focus of the projector 5 may thus be obtained from a point remote therefrom with speed and convenience.

Having thus described the invention, what is claimed as new and desired to secure by Letters Patent is:

1. A focusing device for the lens of a motion picture projector comprising a bracket having a vertical flange and a horizontal portion, means for fastening said vertical flange to the front of the projector, said horizontal portion comprising spaced parallel guide rails adapted to receive shoes on a split ring adapted to hold a lens barrel, a rotatable screw adapted to engage screw threads on said ring to move said ring, a counter shaft mounted on said bracket, means for coupling said counter shaft to said screw, and means for rotating said counter shaft in opposite directions.

2. A focusing device for the lens of a motion picture projector comprising a bracket having a vertical flange and a horizontal portion, means for fastening said vertical flange to the front of the projector, said horizontal portion comprising spaced parallel guide rails adapted to receive shoes on a split ring adapted to hold a lens barrel, a rotatable screw adapted to engage screw threads on said ring to move said ring, a counter shaft mounted on said bracket, means for coupling said counter shaft to said screw, and means for rotating said counter shaft in opposite directions, said last mentioned means comprising a pair of ratchets on said counter shaft and a pair of electromagnetically operating pawls cooperating with said ratchets and mounted on said vertical flange.

FRED W. JACKMAN.